United States Patent [19]
Tamaki et al.

[11] Patent Number: 5,283,510
[45] Date of Patent: Feb. 1, 1994

[54] METHOD FOR DRIVING THREE PHASE STEPPING MOTOR

[75] Inventors: Satoshi Tamaki; Yasuhiro Kondo, both of Hirakata; Yasufumi Ikkai, Kobe, all of Japan

[73] Assignee: Matsushita Electric Industrial Co., Ltd., Osaka, Japan

[21] Appl. No.: 891,442

[22] Filed: May 29, 1992

[30] Foreign Application Priority Data

Jun. 3, 1991 [JP] Japan .................... 3-130933

[51] Int. Cl.⁵ .................................... H02P 5/162
[52] U.S. Cl. .................................... 318/696; 318/81; 318/732; 318/440; 318/808; 388/806; 310/51
[58] Field of Search ............ 318/696, 770, 808, 814, 318/440, 106, 105, 109, 500, 504, 81, 732; 310/51; 388/801, 806

[56] References Cited

U.S. PATENT DOCUMENTS

| | | | |
|---|---|---|---|
| 3,599,069 | 8/1971 | Welch | 318/696 |
| 4,701,687 | 10/1987 | Yoshimoto | 318/696 |
| 4,857,817 | 8/1989 | Kugioka | 318/696 |

Primary Examiner—William M. Shoop, Jr.
Assistant Examiner—Brian Sircus
Attorney, Agent, or Firm—Ratner & Prestia

[57] ABSTRACT

As a method for energizing a three-phase stepping motor of Y-connection, driving current values are set to be values resembling sine wave input approximation, thus making it possible to effect driving at small vibration. Energizing of the three-phase stepping motor is performed by a two-three phase driving scheme which calls for alternately effecting a two-phase excitation of the coils in the motor and a three-phase excitation of the coils in the motor. The driving current flowing through each of the coils approximates a sine wave having normalized values defined by ± 1, ± 0.87, ± 0.5 and 0.

2 Claims, 6 Drawing Sheets (Coil current waveform in each input)

Fig. 1

(Current waveform of each coil in 2-3 phase excitation driving for 3 phase stepping motor)

Fig. 2

(Conception diagram for 2-3 phase excitation driving in 3 phase stepping motor)

*Fig. 3*

( Block diagram for sine wave approximation driving in 2-3 phase excitation driving )

Fig. 4

(Coil current waveform in each input)

METHOD FOR DRIVING THREE PHASE STEPPING MOTOR

BACKGROUND OF THE INVENTION

The present invention generally relates to an electric motor, and more particularly, to a method for driving a three-phase stepping motor.

In recent years, there has been a tendency that stepping motors come to be used for automobiles, and the stepping motor as an automobile component is required to be compact in size, with higher torque and less vibration.

Figure 5:
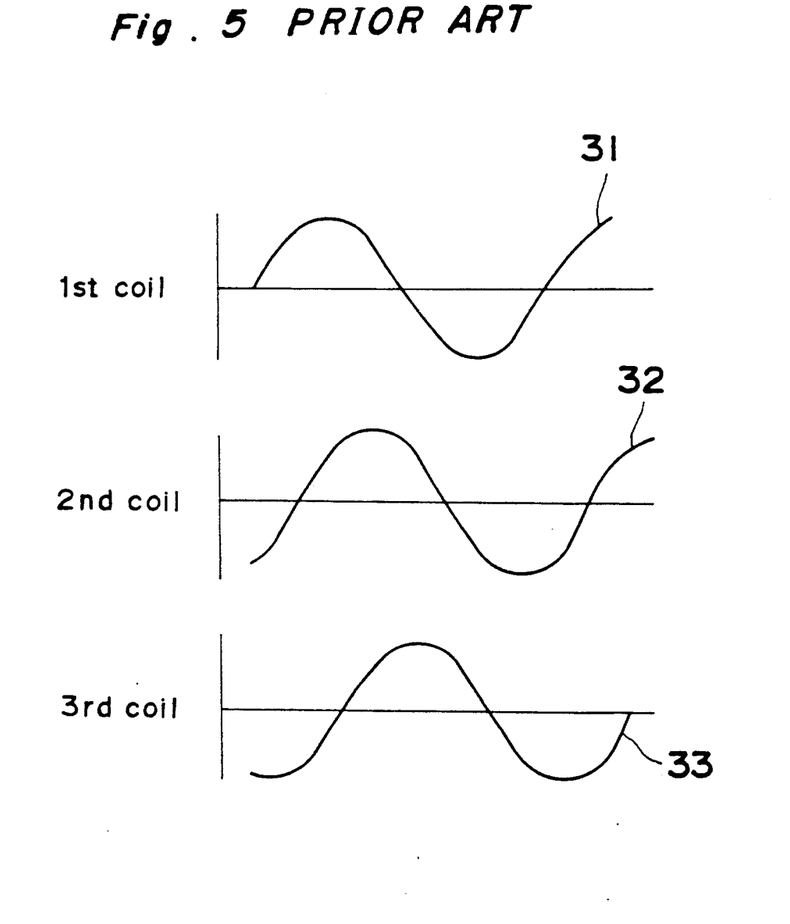
FIG. 5 is waveform diagrams of currents flowing through respective coils during micro-step driving of a conventional three phase stepping motor (already referred to )

FIG. 5 shows driving current waveforms for respective coils in a micro-step driving of a conventional three-phase stepping motor, in which the current following through a first coil is represented by Numeral 31, the current flowing through a second coil, by Numeral 32, and that flowing through a third coil, by Numeral 33.

Figure 6:
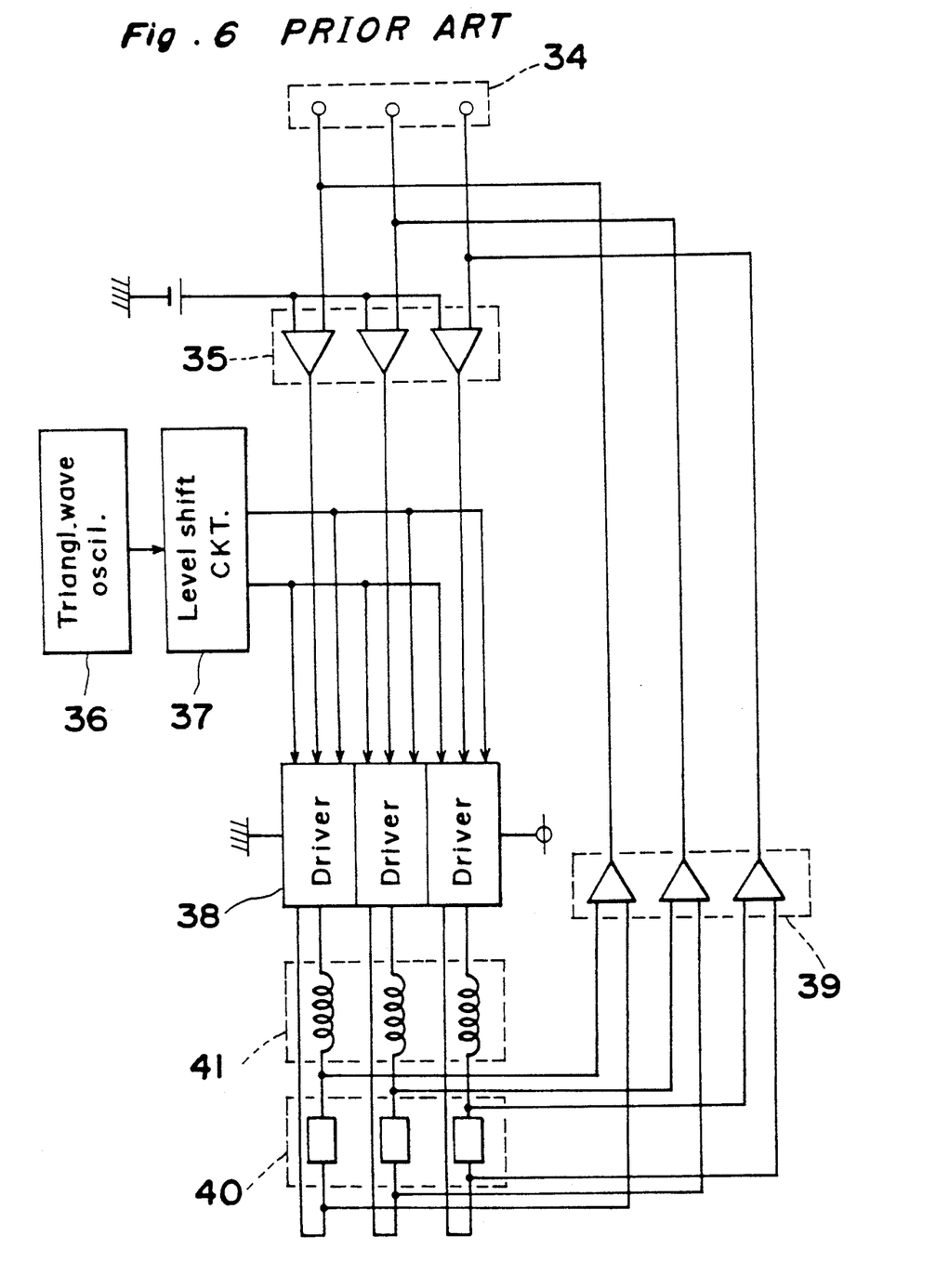
FIG. 6 is a circuit block diagram for subjecting the conventional three phase stepping motor to the micro-step driving (already referred to).

In FIG. 6, there is shown a circuit block diagram for micro-step driving of a conventional three phase stepping motor, which generally includes instruction input terminals 34 connected, through error amplifiers 35, to drivers 38, which are further coupled to the motors 41 connected with current detecting resistors 40, and a triangular wave oscillator 36 coupled with the drivers 38 through a level shift circuit 37, with current feedback amplifiers 39 being coupled between the terminals 34 and the motors 41 connected to the resistor 40 as shown.

By the above arrangement, sine waves respectively shifted in phase by 120° are inputted to the terminals 34 as the instructions. Each of the current detecting resistors 40 is inserted per coil one phase to effect the current detection for each one phase, and the current thus detected is applied to the error amplifiers 35 through the feedback amplifiers 39. Thus, the motor current is controlled by constituting the current minor loop. The drivers 38 are constituted by a transistor H bridge which allows current to be fed to each phase, and respectively subjected to the PWM (Pulse Width Modulation) control. The level shift circuit 37 is provided with a rest period for preventing arm short-circuiting of the transistor H bridge. By arranging as described above, the motor current synchronized with the instruction value may be controlled, and thus, it becomes possible to subject the three-phase stepping motor to the micro-step driving.

However, in the known arrangement as described above, there is such a disadvantage that the current detection must be effected for the micro-step driving, thus requiring the current detecting resistors. Moreover, the circuit construction becomes complicated for constituting the current minor loop, with a consequent rise in cost. Furthermore, there has been such a problem that due to the complicated circuit construction, the circuit tends to be large in the scale, and can not be employed for application into small spaces.

SUMMARY OF THE INVENTION

Accordingly, an essential object of the present invention is to provide a method for driving a three-phase stepping motor, which is capable of effecting driving approximated to micro-step driving through a simple circuit construction.

Another object of the present invention is to provide a method for driving a three-phase stepping motor as described above, which can be readily introduced into a practical application at a high reliability.

In accomplishing, these and other objects, according to one preferred embodiment of the present invention, there is provided a method for driving a three-phase stepping motor, which includes the steps of energizing coils for said three-phase stepping motor of Y-connection having three terminals, and effecting two-three phase excitation driving for rotating the stepping motor during the coil energization by alternately repeating two-phase excitation for energizing coil two-phases and three-phase excitation for energizing coil three-phases.

By the method according to the present invention as described above, values of the driving currents flowing through the coils become normalized values $\pm 1$, $\pm 0.75$, $\pm 0.5$, and 0, which resemble the normalized current values $\pm 1$, $\pm 0.87$, $\pm 0.5$ and 0 approximating to the sine wave input, and may be regarded as the sine wave approximated driving, thus making it possible to realize smooth driving with less vibration.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

EMBODIMENT 1

Figure 1:
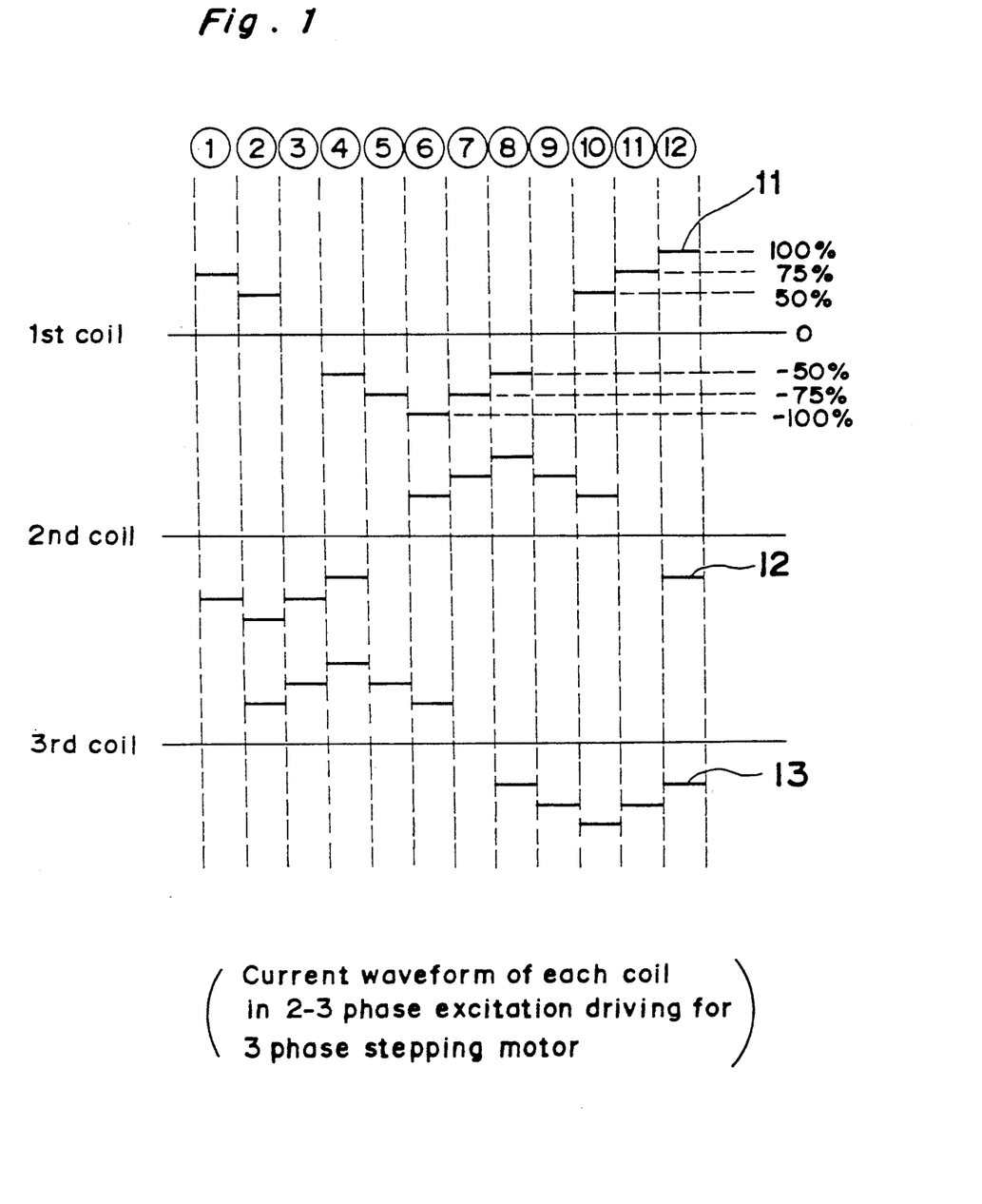
FIG. 1 is a diagram showing waveforms for respective coils in two-three phase excitation driving of a three phase stepping motor according to a first embodiment of the present invention.
Figure 2:
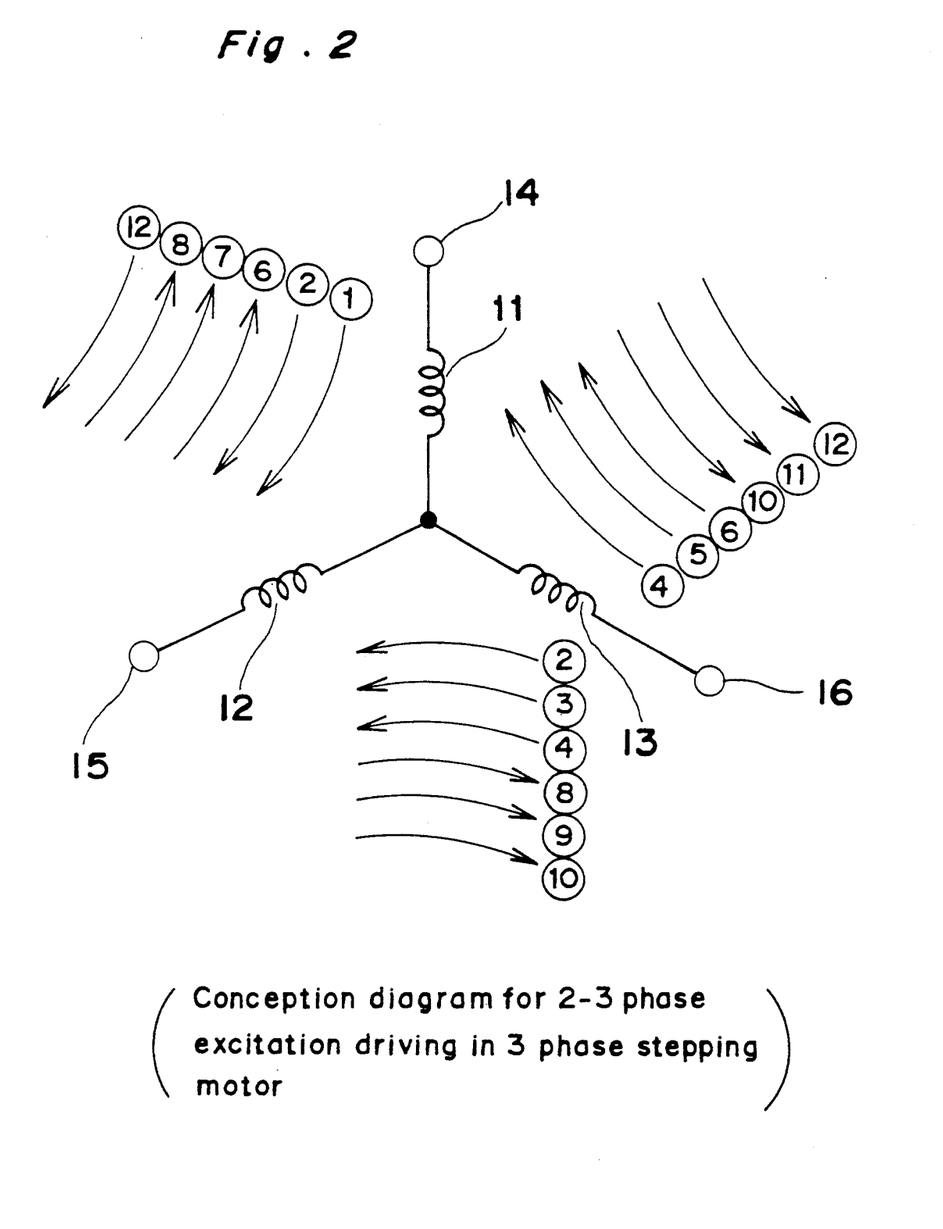
FIG. 2 is a conception diagram of the two-three phase excitation driving in the three phase stepping motor for explaining the first embodiment related to FIG. 1.

Referring now to the drawings, FIG. 1 shows current waveforms of respective coils when a three phase stepping motor according to the present invention is subjected to two-three phase excitation driving, in which the current flowing through a first coil is represented by Numeral 11, the current flowing through a second coil, by Numeral 12, and the current flowing through a third coil, by Numeral 13, while FIG. 2 is a conception diagram showing the sequence of energization of the respective coils for effecting the two-three phase excitation driving of the three phase stepping motor. In FIG. 2, a first end of the coil is indicated by Numeral 14, a second end of the coil, by Numeral 15, and a third end of the coil, by Numeral 16.

Table 1 given below summarizes the states of connection of the coil in the respective exciting states of the first coil, equivalent resistance values, current values flowing through the first coil, and normalized current values for quick reference and the fist coil is indicated by a symbol u in Table 1.

as a two-phase excitation. Subsequently, simultaneously with the current-passing from the first end 14 to the second end 15, the current is also passed from the third end 16 to the second end 15, and this is referred to as a three-phase excitation. Thus, the energization is successively effected according to the sequence shown in the conception diagram of FIG. 2. In other words, for energization of the coils, the two-three phase excitation driving in which the two-phase excitation and the three-phase excitation are alternately repeated is effected.

| Excitation order | State of coil connection | Equivalent resistance value | Value of current flowing trough u | Normalized current value |
|---|---|---|---|---|
| ① |  | $2R$ | $\frac{1}{2}\frac{E}{R}$ | 0.75 |
| ② |  | $\frac{3}{2}R$ | $\frac{1}{3}\frac{E}{R}$ | 0.5 |
| ③ | — | 0 | 0 | 0 |
| ④ |  | $\frac{3}{2}R$ | $\frac{1}{3}\frac{-E}{R}$ | −0.5 |
| ⑤ |  | $2R$ | $\frac{1}{2}\frac{-E}{R}$ | −0.75 |
| ⑥ |  | $\frac{3}{2}R$ | $\frac{2}{3}\frac{-E}{R}$ | −1 |
| ⑦ |  | $2R$ | $\frac{1}{2}\frac{-E}{R}$ | −0.75 |
| ⑧ |  | $\frac{3}{2}R$ | $\frac{1}{3}\frac{-E}{R}$ | −0.5 |
| ⑨ | — | 0 | 0 | 0 |
| ⑩ |  | $\frac{3}{2}R$ | $\frac{1}{3}\frac{E}{R}$ | 0.5 |
| ⑪ |  | $2R$ | $\frac{1}{2}\frac{E}{R}$ | 0.75 |
| ⑫ |  | $\frac{3}{2}R$ | $\frac{2}{3}\frac{E}{R}$ | 1 |

Referring particularly to FIG. 2, the driving method for the three-phase stepping motor having the construction as described above will be described hereinafter.

In the first place, current is passed from the first end 14 to the second end 15 of the coils, which is referred to When the resistance value of each of the three coils is represented by R, and the voltage to be applied to the coil end is denoted by E, the value of the current flowing through the first coil in the two phase excitation is represented by $\pm E/(2R)$, since the first and the second coils are connected in series to each other. Meanwhile, the value of the current flowing through the first coil in the three-phase excitation takes two values. These are in two groups, i.e. one group of ②, ④, ⑧, and ⑩, and another group of ⑥ and ⑫ in FIG. 2. The function may be classified into the cases where the current flows from the first coil to the remaining two ends or the current flows from other two ends to the first coil, or into the cases other than the above. In the group of ②, ④, ⑧ and ⑩ referred to earlier, the fist coil and another coil are connected in parallel, with the remaining one coil being connected is series thereto. Meanwhile, in the group of ⑥ and ⑫, the other two coils connected in parallel to each other, are connected in series with the first coil. It will be seen that in the above respective states, upon impression of voltage to the coil ends, the current value for the group of ②, ④, ⑧ and ⑩ ½ that of the group of ⑥ and ⑫.

The states as described above are tabulated in Table 1 referred to earlier.

From Table 1, it is observed that the values of normalized current flowing through the first coil are successively as follows. $0.75 \rightarrow 0.5 \rightarrow 0 \rightarrow -0.5 \rightarrow -0.75 \rightarrow -1 \rightarrow -0.75 \rightarrow -0.5 \rightarrow 0 \rightarrow 0.5 \rightarrow 0.75 \rightarrow 1$. Here, in the case where the driving current is subjected to sine wave approximation input, the normalized current values will become $0.87 \rightarrow 0.5 \rightarrow 0 \rightarrow -0.5 \rightarrow 31\ 0.87 \rightarrow -1 \rightarrow -0.87 \rightarrow -0.5 \rightarrow 0 \rightarrow 0.5 \rightarrow 0.87 \rightarrow 1$, which are closely resembling the driving current values according to the present invention.

As described so far, according to the present invention, in the method for passing current through the coils, by alternately repeating the two-phase excitation and three-phase excitation so as to effect the two-three phase excitation driving for successively energizing the particular coils, the driving currents assume values extremely resembling those in the sine wave input approximation, and it becomes possible to realize driving of the three-phase stepping motor at small vibration.

EMBODIMENT 2

According to the exciting method of the Embodiment 1, upon comparison with the sine wave input approximation, the driving current value is different only during the two-phase excitation. Therefore, in order to drive through a still smaller vibration, a method which effects the two-three phase excitation driving, and also, which can subject the driving current value to the sine wave input approximation will be explained hereinafter.

Figure 3:
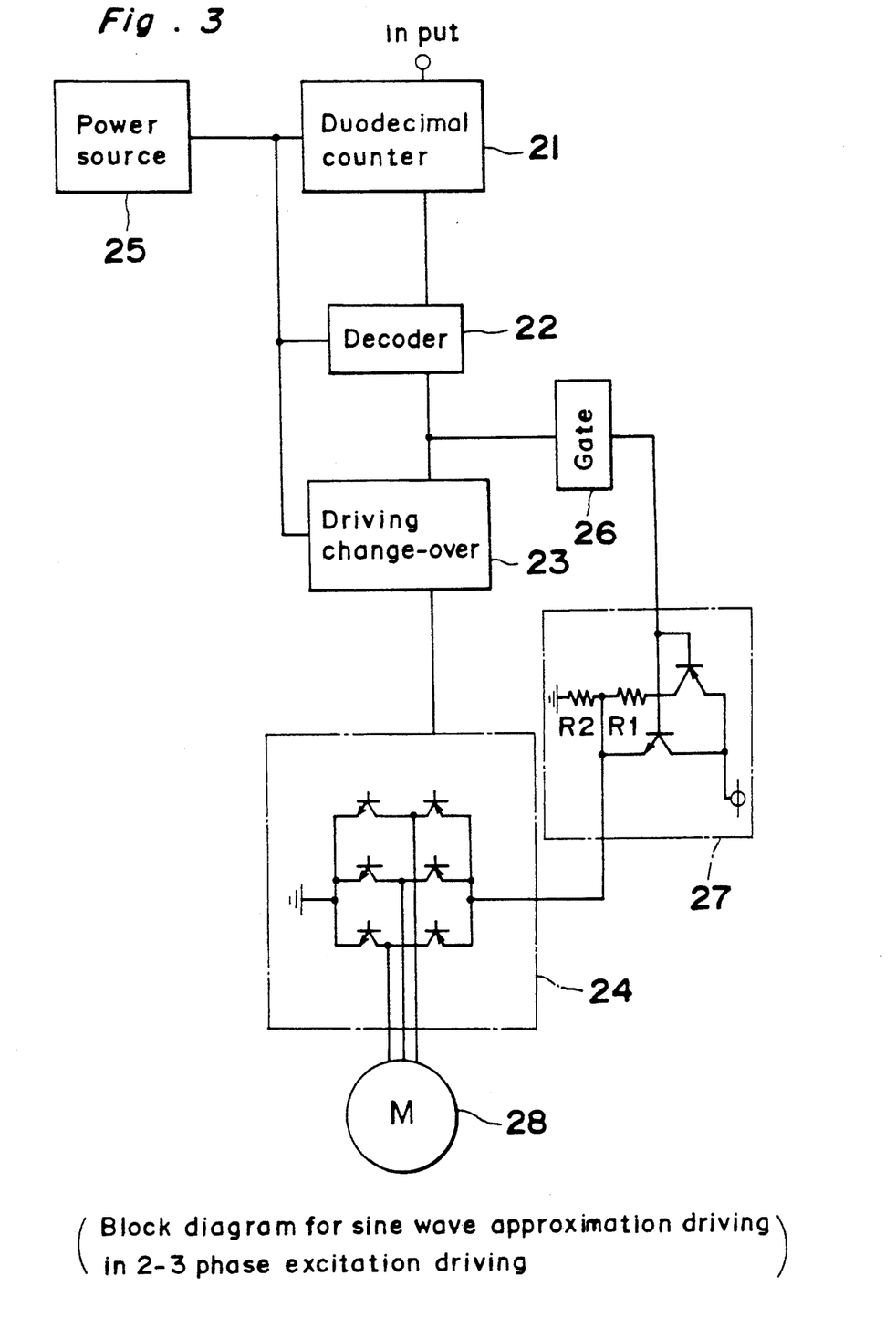
FIG. 3 is a circuit block diagram for a sine wave approximation driving in the two-three phase excitation driving according to a second embodiment of the present invention.

Subsequently, the second embodiment of the present invention will be explained with reference to a block diagram for the sine wave approximation driving in the two-three phase excitation driving, which generally includes an input terminal connected, through a duodecimal counter 21, a decoder 22 and a driving change-over section 23, to a driver 24 which is coupled to a motor 28, a power source 25 connected to the duodecimal counter 21, the decoder 22 and the driving change-over section 23 and a voltage change-over section 27 (including two transistors and resistors R1 and R2, and surrounded by one dotted chain line) connected between the decoder 22 and the driving change-over section 23 through a gate circuit 26, and also to said driver 24 (including six transistors connected to each other and also to the motor 28, and surrounded by one dotted chain line) as shown.

Based on the block diagram in FIG. 3, arranged as described above, the driving method of the three-phase stepping motor will be described hereinafter.

Figure 4:
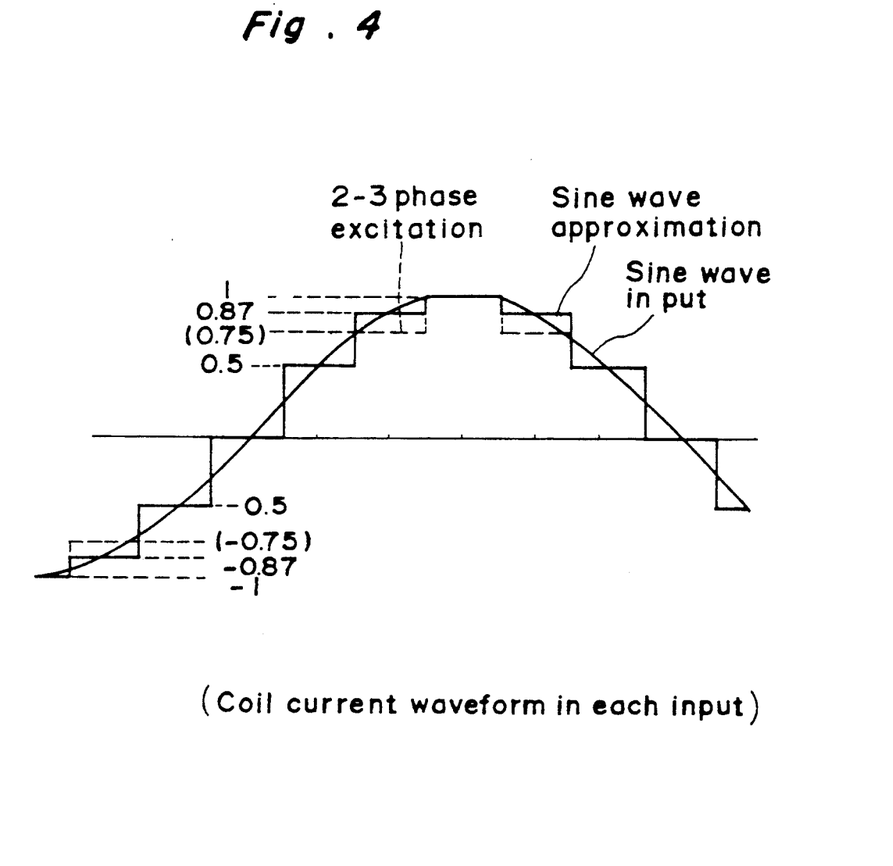
FIG. 4 is a driving current waveform diagram of the coil in each input state as related to the second embodiment.

Firstly, instruction pulses are inputted to the duodecimal counter 21, and the counter output varies from 0 to 11 in synchronization with the instruction pulses. The values are decoded by the decoder 22, and for causing coil currents following the sequence of FIG. 2 to flow by the driving change-over section 23, the six transistors provided within the driver 24 are turned ON. Moreover, in order to subject the driving current values to the sine wave approximation, the signal of the two-phase excitation is inputted from an output of the decoder 22 into the voltage change-over section 27, with the coil impression voltage being increased to approximately 1.15 times that at the three-phase excitation so that the current value during the two-phase excitation becomes normalized current value $\pm 0.87$. On the assumption that the two-phase excitation signal is "high active", the coil impression voltage during the two-phase excitation can be raised to 1.15 times that at the three-phase excitation by selecting R1:R2 to be above 1:6 at the voltage change-over section 27. FIG. 4 shows the waveforms of the coil during the two-three phase excitation, sine wave approximation, and sine wave input referred to in the first embodiment.

As described above, by changing over the coil impression voltage between the two-phase excitation and the three-phase excitation so that said voltage during the two-phase excitation is about 1.15 times that during the three-phase excitation, driving approximated to the sine wave input may be realized in the two-three phase excitation driving.

It is to be noted here that, according to the foregoing embodiments, although the coil impression voltage is controlled to render the current value during the two-phase excitation to be normalized current value $\pm 0.87$, similar effect can of course be obtained by controlling the duty to turn ON the respective transistors at the driving change-over section 23 in FIG. 3 for direct control of the current value during the two phase excitation, thereby to produce the normalized current value $\pm 0.87$.

As is clear from the foregoing description, according to the present invention, in the excitation method of the three-phase stepping motor of the Y-connection, by alternately repeating the two-phase excitation and the three phase excitation, and also successively energizing the specific coils, driving current closely resembling the sine wave input approximation can be caused to flow, while by controlling the current during the two-phase excitation, current approximated to the sine wave input can be caused to flow, and as a result, the vibration peculiar to the stepping motor may be advantageously reduced. Furthermore, cost reduction can also be achieved owing to the simple circuit construction, and since actual mounting of chips becomes possible, the scale of the circuit can also be made smaller. Moreover, since three lead wires are sufficient for the purpose, the driving method for the three-phase stepping motor less limited by the motor space can be realized.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method for two-three phase driving of a three-phase stepping motor having a Y-connection with three respective coils and terminals comprising the steps of:
   a) energizing the respective coils, to provide a two-phase excitation, by an input driving current having values at the respective coils defined by a set of normalized values which are ±0.87 and 0;
   b) energizing the respective coils, to provide a three-phase excitation, by an input driving current having values at the respective coils defined by a set of normalized values which are ±1 and ±0.5,
   c) repeating, alternately, steps a) and b) to provide two-three phase excitation driving of said three-phase stepping motor, wherein the normalized values during two-phase excitation are achieved by varying the input driving current between the two-phase excitation of step a) and the three-phase excitation of step b),
   whereby the input driving current values for the respective coils approximate a sine wave having the normalized values of ±1, ±0.87, ±0.5 and 0 in order to minimize vibration.

2. A method according to claim 1, wherein the input driving current for two-phase excitation is varied by 1.15 times in order for the normalized values to approximate the sine wave.

* * * * *